(12) United States Patent
Takahashi

(10) Patent No.: US 7,063,500 B1
(45) Date of Patent: Jun. 20, 2006

(54) METHOD AND APPARATUS OF STACKING VENEER SHEETS

(75) Inventor: Keisuke Takahashi, Aichi (JP)

(73) Assignee: Meinan Machinery Works, Inc., Obu (JP)

( * ) Notice: Subject to any disclaimer, the term of this patent is extended or adjusted under 35 U.S.C. 154(b) by 0 days.

(21) Appl. No.: 11/261,546

(22) Filed: Oct. 31, 2005

(51) Int. Cl.
*B65G 57/03* (2006.01)
*B65H 29/36* (2006.01)

(52) U.S. Cl. ............... 414/793.7; 414/791.1; 414/792.7; 414/793.5

(58) Field of Classification Search ............ 414/791.1, 414/792.7, 792.9, 793.1, 793.3, 793.5, 793.7, 414/793.8, 794.4, 794.7, 794.8; 144/245.5, 144/245.7, 245.2, 245.4, 250.26, 245.6; 294/61
See application file for complete search history.

(56) References Cited

U.S. PATENT DOCUMENTS

| | | | | |
|---|---|---|---|---|
| 3,698,708 A | * | 10/1972 | Brawn | 271/180 |
| 3,704,882 A | | 12/1972 | Brookhyser | 271/68 |
| 3,904,046 A | * | 9/1975 | Lunden | 414/793.8 |
| 4,189,271 A | * | 2/1980 | Hasegawa | 414/789.6 |
| 4,256,214 A | * | 3/1981 | Back, Jr. | 198/367 |
| 4,360,303 A | * | 11/1982 | Rysti | 414/789.5 |
| 4,681,003 A | | 7/1987 | Bernath | 83/80 |
| 5,049,030 A | * | 9/1991 | Lockert | 414/788.7 |
| 5,564,892 A | * | 10/1996 | Holbert | 414/793.1 |

* cited by examiner

*Primary Examiner*—Bena Miller
(74) *Attorney, Agent, or Firm*—Armstrong, Kratz, Quintos, Hanson & Brooks, LLP (57) ABSTRACT

A method of stacking a veneer sheet carried by a conveyer onto a pile of similar veneer sheets is disclosed. Veneer sheet is separated from the conveyer thereby to allow the sheet to drop from the conveyer toward the pile. The veneer sheet being dropped is restrained by an elongated flexible member which is lowered substantially simultaneously with the above separation and at such a speed that the flexible member is brought into frictional engagement with the veneer sheet at at least one side thereof which extends in substantially perpendicular relation to the length of the elongated flexible member. The flexible member is lowered until it is bent in pressing engagement with the veneer sheet then dropped onto the pile at the above side thereof. An apparatus for performing the method is also disclosed.

7 Claims, 8 Drawing Sheets

FIG. 8
PRIOR ART

METHOD AND APPARATUS OF STACKING VENEER SHEETS

BACKGROUND OF THE INVENTION

The present invention relates to a method of stacking a sheet of wood veneer and also to an apparatus for performing the method.

According to a conventional veneer sheet stacking method which is performed during a process of manufacturing plywood panels using such veneer sheets, a veneer sheet (or a plurality of veneer sheets laid one on another) is carried by a conveyer having a suitable sheet support to a stacking position, where the support is operated to open thereby to release and allow the veneer sheet (or sheets) to drop onto a pile of similar veneer sheets. Since veneer for such stacking operation is provided in the form of a sheet having a large surface area for its mass or weight, the veneer sheet is easily subjected to the influence of air resistance when it is being dropped, so that it may not fall just straight onto the pile, but placed out of position on the pile, with the result that a disorderly pile of veneer sheets will be formed. During transferring veneer sheets of such a pile to a subsequent station for any further processing, the pile and hence veneer sheets therein are susceptible to damage.

Figure 8:
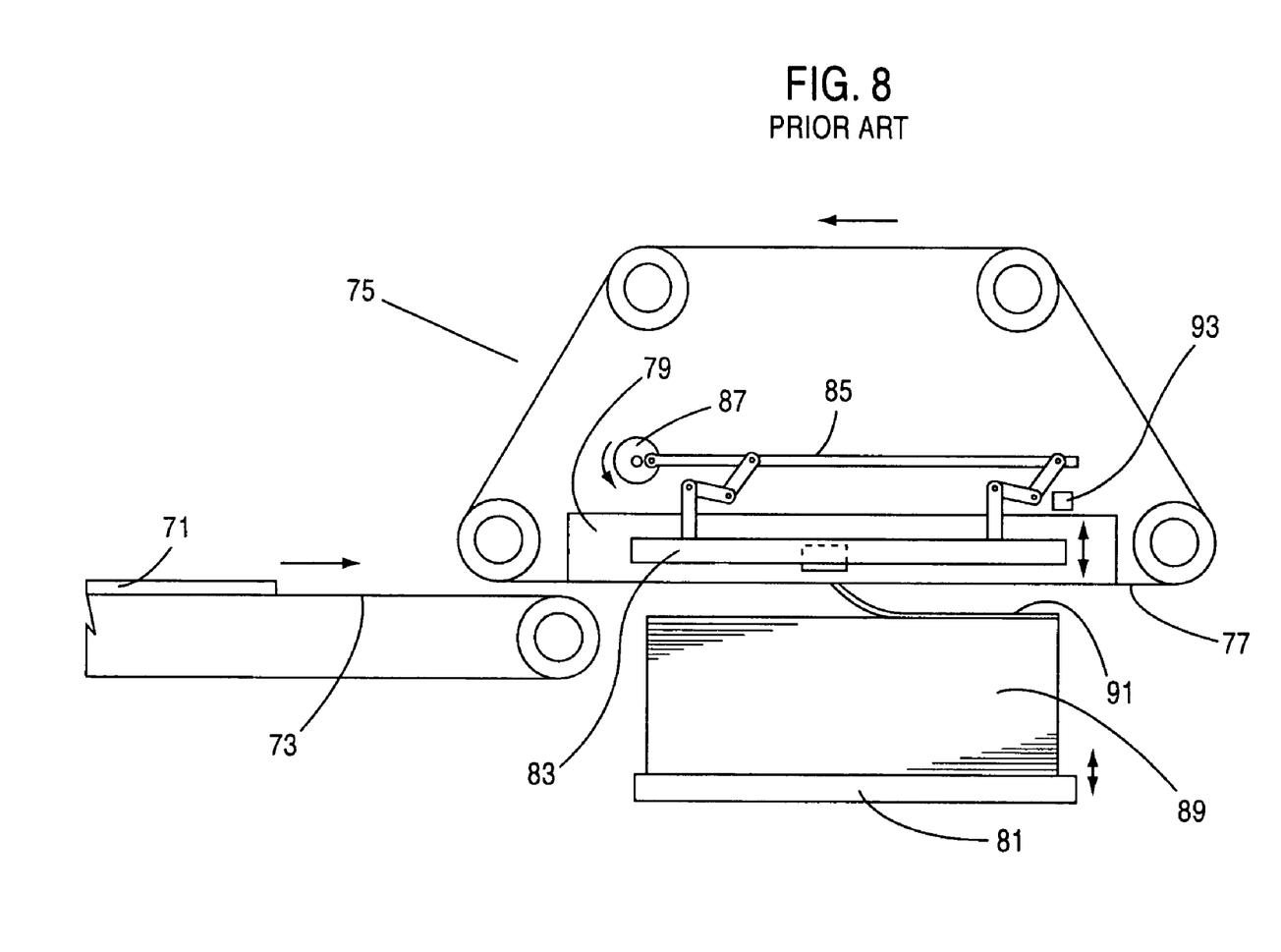
FIG. 8 is a schematic side view showing a conventional veneer stackaing apparatus.

An apparatus which addressed such problem is proposed by Examined Japanese Utility Model Application Publication No. S52-22062, which is shown in FIG. 8. Reference numeral 73 on the drawing designates an endless conveyer which is operable to transfer a veneer sheet 71 in arrow direction toward the stacking apparatus. The stacking apparatus, which is generally designated by 75, is located adjacent to the downstream end of the conveyer 73 as seen in the conveying direction of veneer sheet 71. The stacking apparatus 75 has a plurality of perforated endless belts 77 (only one being shown in FIG. 8) which are operable to hold a veneer sheet by suction or vacuum and movable in arrow direction to carry such veneer sheet to the stacking position that is located immediately above a pile of veneer sheets 89 placed on a support block 81. Reference numeral 79 depicts a suction device 79 disposed in contact with the upper surface of the bottom horizontal legs of the perforated endless belts 77 for creating vacuum for holding the veneer sheet 71.

The stacking apparatus 75 further has a separating bar 83 which is usually made of steel and movable vertically reciprocally as indicated by double-headed arrow by a linkage 85 which is moved by a rotatable eccentric wheel 87 driven by a motor (not shown). The bar 83 separates veneer sheet 71 from the perforated endless belts 77 thereby to allow the veneer sheet 71 to fall toward the pile 89. As is apparent from the drawing, the separating bar 87 makes one stroke of reciprocating motion by one complete turn of the eccentric wheel 87.

Between any two adjacent belts 77 is provided a restraining band 91 having one end thereof fixed at a position that is higher than the bottom horizontal legs of the perforated endless belts 77. As shown in FIG. 8, the restraining band 91 droops by its own weight such that a majority part of the band 91 rides on the top veneer sheet in the pile 89 with the distal free end of the band 91 located adjacent to the downstream end of the bottom horizontal legs of the endless belts 77. Reference numeral 93 designates a sensor for detecting the arrival of a veneer sheet which has been conveyed by the belts 77 to the aforementioned stacking position immediately above the pile of veneer sheets 89. Though not shown in the drawing, the support block 81 has a suitable means such as hydraulic cylinder for elevating the stacking block 81 in response to a signal generated by a sensor such photocell operable to detect the top position of the pile 89 so that the top of the pile 89 always maintains a predetermined height.

In operation of the apparatus, a veneer sheet 71 moved forward by the conveyer 73 is picked up and held by the endless perforated belts 77 under the influence of vacuum developed by the suction device 79 and further conveyed. In the meantime, the veneer sheet 71 is brought into contact with the restraining band 91 and moved further under and in contact with the restraining band 91 until the leading end of the moving veneer sheet 71 is detected by the sensor 93, which then generates a detection signal. In response to the signal, the motor is activated thereby to operate the separating bar 83 so as to make one complete stoke of up and down movement as indicated by double-headed arrow. Thus, the veneer sheet 71 is separated and dropped off from the belts 77 together with the band 91 then riding on the veneer sheet 71. Because of the frictional force between the restraining band 91 and the veneer sheet 71 due to the weight of the former riding on the latter, the veneer sheet 71 is dropped substantially vertically straight without swerving or swaying and. Therefore, the veneer sheet 71 is stacked in an orderly manner onto the pile 89.

In the above-described prior art apparatus, the force acting on the veneer sheet 71 in downward direction is provided by the weight of the restraining band 91 (to be more precise, the downward force is actually smaller than the weight of the band 91 because the veneer sheet 71 is then being dropped). If the weight of the restraining band 91 is small, however, the frictional force between veneer sheet 71 and the restraining band 91 is reduced and the veneer sheet 71 cannot be prevented from making irregular movement while it is being dropped. If the weight of the restraining band 91 is increased with an attempt to restrain the movement of the veneer sheet 71, a force of greater magnitude is applied to the veneer sheet 71 when it is brought into contact with and moved under the restraining band 91 having an increased weight. As a result, the veneer sheet 71 may change its posture or be subjected to a damaging force while it is being moved by the belts 77.

Apart from the prior art apparatus of the aforementioned publication, another apparatus is known in the art in which a veneer sheet carried forward by a conveyer belt such as the belt 77 is separated therefrom by rapidly moving a bar which is similar to the bar 83 but operable to move to force a veneer sheet downward until it is pressed against the top veneer sheet in the pile. The bar is usually made of a rigid material such as steel. When the number of veneer sheets in the pile is still small, the bar may receive a damaging shock of impact when the veneer sheet is pressed by the bar against the top of the pile placed on a stacking block which is also made of a rigid material.

SUMMARY OF THE INVENTION

The present invention has been made in view of the above drawbacks and, therefore, an object of the present invention is to provide a method of stacking veneer sheets and an apparatus of practicing the method.

In order to achieve the object, the present invention provides a method of stacking a veneer sheet carried by a conveyer onto a pile of similar veneer sheets. According to the method, the veneer sheet being carried by the conveyer is separated therefrom at a stacking position in the apparatus that is located immediately above the pile of veneer sheets thereby to allow the separated veneer sheet to fall or drop from the conveyer. The veneer sheet being dropped is restrained by an elongated flexible member which is normally disposed extending above and without interfering with the veneer sheet being carried by the conveyer. That is, the elongated flexible member is operable to be lowered by any suitable means such as air cylinder substantially simultaneously with the separating of the veneer sheet in a taut state and at such a speed that the flexible member is brought into frictional engagement with the veneer sheet at at least one side thereof which extends in substantially perpendicular relation to the length of the elongated flexible member thereby to restrain the veneer sheet being dropped from the conveyer. The elongated flexible member is lowered until it is bent at the aforementioned one side of the veneer sheet which is then dropped onto the pile of veneer sheets, thereby to restrain the veneer sheet.

The apparatus of stacking a veneer sheet according to the present invention includes a conveyer for carrying the veneer sheet in a predetermined direction. The conveyer may be in the form of an endless belt having a number of piercing spikes extending outward from the belt and pierceable through a veneer sheet for supporting or holding the veneer sheet. Adjacent to the conveyer is provided means for separating the veneer sheet from the conveyer at a position that is immediately above the pile of veneer sheets thereby to allow the separated veneer sheet to drop from the conveyer;

The apparatus further includes an elongated flexible member and means for moving the elongated flexible member between the standby position thereof where the flexible member is disposed extending above and without interfering with the veneer sheet carried by the conveyer and the lowered position thereof where the elongated flexible member is lowered until being bent in pressing engagement with the veneer sheet then dropped onto the pile of veneer sheets at at least one side of the veneer sheet which extends in substantially perpendicular relation to the length of the elongated flexible member. The moving means, which is an air cylinder in the preferred embodiment of the invention, is operable to cause the elongated flexible member to be lowered toward the lowered position in a taut state and at such a speed that the flexible member is brought into frictional engagement with the veneer sheet being dropped.

In the apparatus, a sensor is provided for detecting the arrival of the veneer sheet at the above predetermined position and it is operable to generate a detection signal. The detection signal is transmitted to a control which is operable in response to such detection signal to activate the separating means and the air cylinder as the moving means so that the veneer sheet is separated from the conveyer and substantially simultaneously the elongated flexible member is lowered toward the lowered position.

In the preferred embodiment of the present invention, the elongated flexible member in the standby position thereof extends substantially in the direction in which the veneer sheet is carried by the conveyer, and the air cylinder is located and operable such that the elongated flexible member in the lowered position thereof is bent in pressing engagement with the veneer sheet at the side thereof which corresponds to the leading end or side of the veneer sheet as seen in the direction in which the veneer sheet is moved by said conveyer. In this embodiment, the elongated flexible member is connected at one end thereof to the extensible rod of the cylinder.

In another embodiment of the invention, the elongated flexible member is connected at the opposite ends thereof to the rods of cylinders, so that the flexible member in the lowered position thereof is bent in pressing engagement with the veneer sheet at two sides thereof which correspond to the leading and trailing ends or sides of the veneer sheet as seen in the direction in which the veneer sheet is moved by said conveyer.

In the arrangement wherein the elongated flexible member is connected at the opposite ends thereof to any part of the stationary frame of the apparatus, the moving means is a cylinder having an extensible rod with a roller at the distal end thereof and operable to move by way of the roller the elongated flexible member to its lowered position.

Features and advantages of the present invention will become more apparent to those skilled in the art from the following description of preferred embodiments of the invention, which description is made with reference to the accompanying drawings, wherein:

DETAILED DESCRIPTION OF THE EMBODIMENTS

Figure 1:
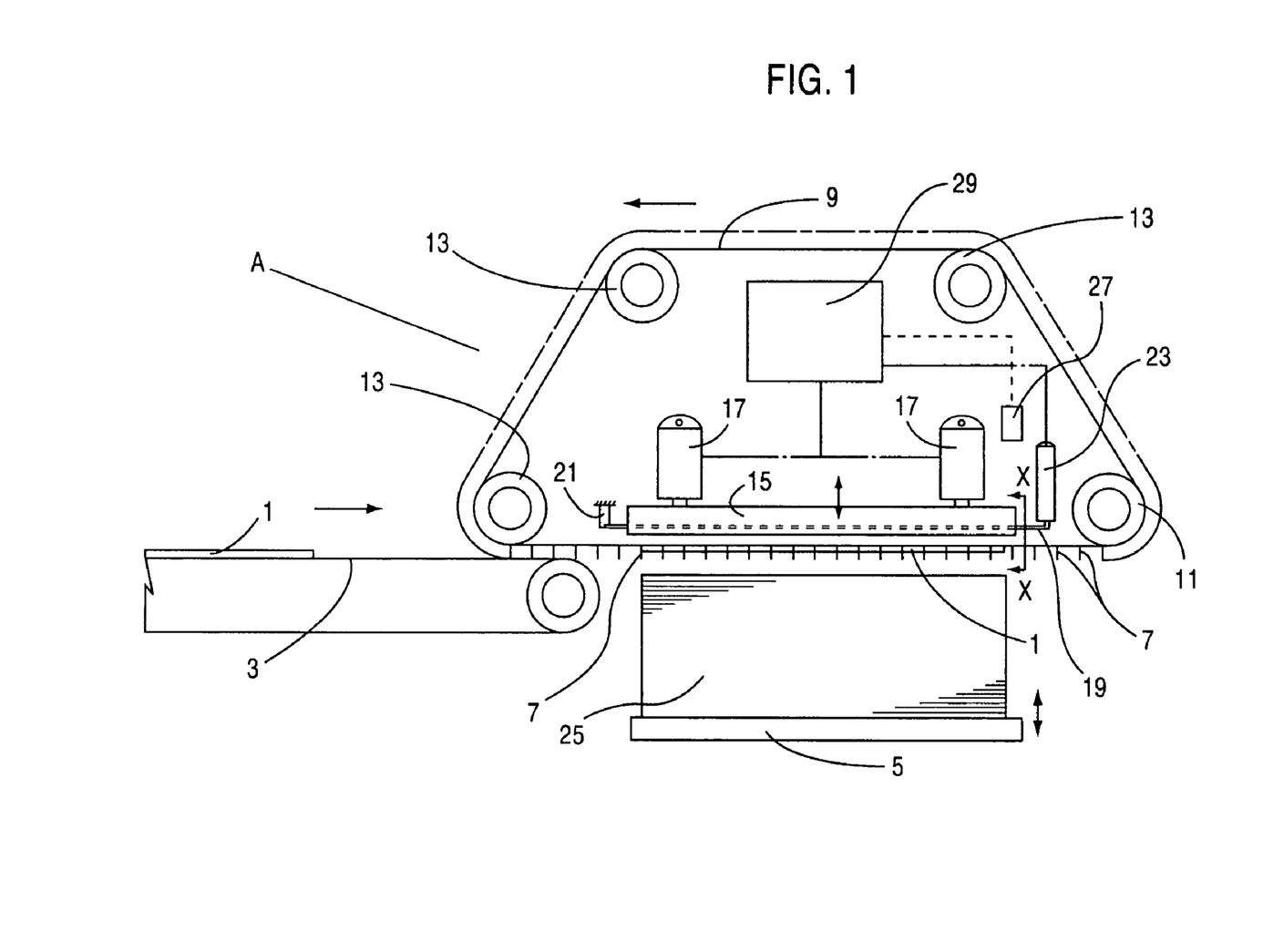
FIG. 1 is a schematic side view showing a preferred embodiment of veneer sheet stacking apparatus according to the present invention.
Figure 2:
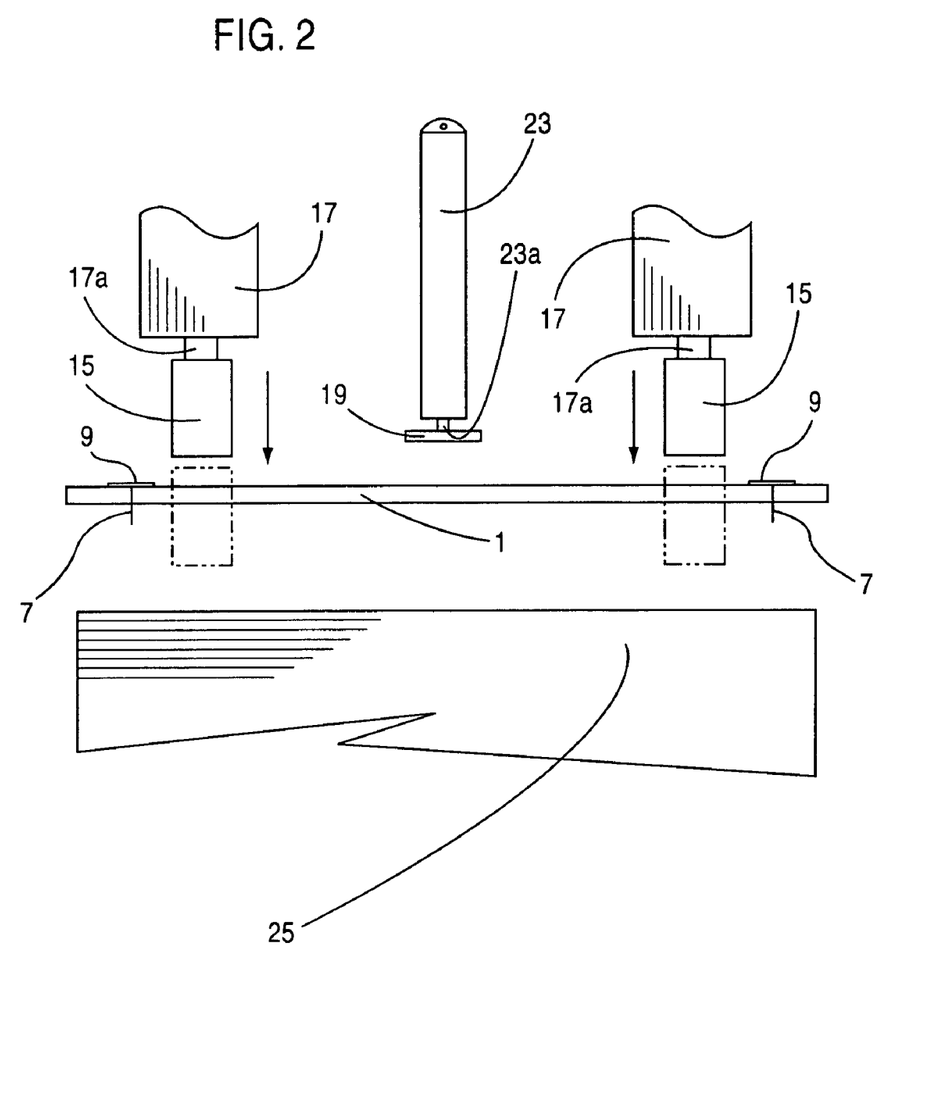
FIG. 2 is a partially sectional view of the veneer sheet stacking apparatus as seen from line X—X of FIG. 1.
Figure 3:
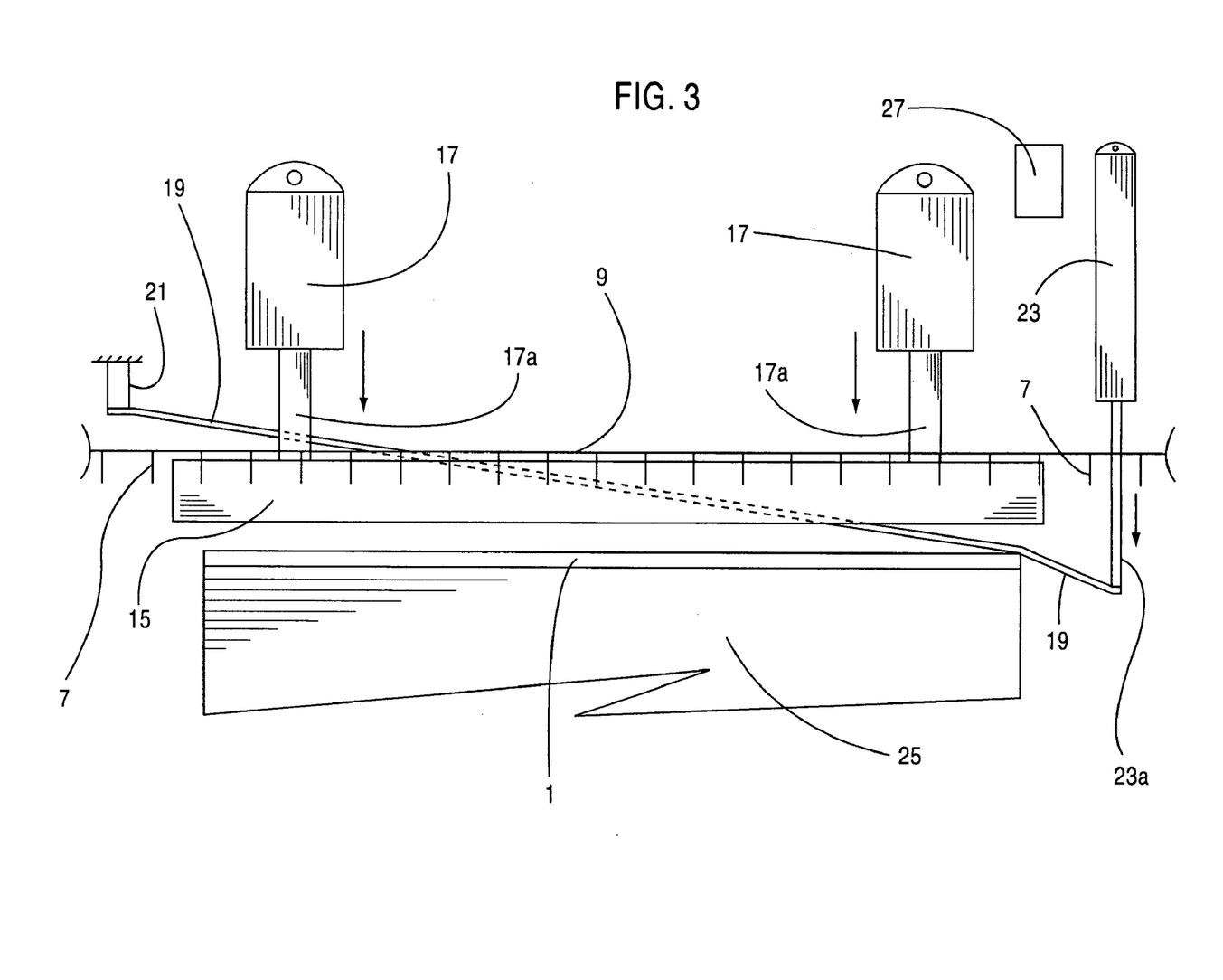
FIG. 3 is an illustrative partial side view showing the operation of the apparatus of FIG. 1.

The following will describe a preferred embodiment of veneer sheet stacking apparatus of the present invention with reference to FIGS. 1 through 3.

Referring to FIG. 1, there is provided a conveyer 3 for advancing veneer sheets 1 successively (only one sheet being shown in the drawing) in arrow direction at a spaced interval toward a veneer stacking apparatus which is generally designated by "A". The veneer sheet 1 is of a rectangular or quadrilateral shape having four sides.

Referring to FIGS. 1 and 2, the stacking apparatus A has a pair of endless spiked conveyer belts 9 spaced apart in the direction that is perpendicular to the direction in which veneer sheet 1 are moved by the conveyer 3. Each endless spiked conveyer belt 9 is trained around a positively driven pulley 11 and other three idle pulleys 13 so as to be driven to move constantly in arrow direction indicated at the top leg of the belt 9 at substantially the same speed as the conveyer 3. The endless belt 9 has a number of pikes or tooth-like projections 7 extending outwardly therefrom and spaced at a predetermined interval for piercing through the veneer sheet 1 as shown most clearly in FIG. 2 thereby to carry the veneer sheet 1 pierced by the spikes 7 to a stacking position immediately above a pile of veneer sheets 25 formed on a stacking block 5.

The stacking apparatus A further has a pair of parallel bars 15 extending along and adjacent to the bottom legs of the respective endless spiked conveyer belts 9 for separating the pierced veneer sheet 1 from the endless spiked conveyer belts 9. Each separating bar 15 is connected to rods 17a of a pair of air cylinders 17, as shown in FIG. 1. The rods 17a of the air cylinders 17 and hence the separating bars 15 connected thereto are normally placed at their raised or standby position, as shown by solid lines in FIGS. 1 and 2, where a veneer sheet 1 held by the spikes 7 of the conveyer belts 9 can move below the separating bars 15. The air cylinders 17 are operable such that their rods 17a make one stroke of rapid reciprocating movement between the retracted and extended positions thereof for a length of stroke that is long enough for the veneer sheet 1 held by the spiked conveyer belts 9 to be pressed by the separating bars 15 and released from pierced engagement with the spikes 7 of the belts 9. The lowered position of the separating bars 15 are indicated by dotted lines in FIG. 2. The air cylinders 17 are operatively connected to a control 29 of the stacking apparatus A.

An elongated flexible band 19 is disposed extending in the same direction as the veneer sheet 1 is conveyed by the endless spiked belts 9. To be more specific, the elongated flexible band 19 extends between the paired separating bars 15, one end of which adjacent to the conveyer 3 is fixed to part 21 of the frame of the apparatus and the other end of which is connected to distal end of a piston rod 23a of an air cylinder 23, for restraining a veneer sheet when it is being dropped off from the endless spiked conveyer belts 9 and also when it is dropped onto the pile 25, as will be described more in detail in later part hereof. With the rod 23 retracted in the air cylinder 23, the flexible restraining band 19 is disposed extending substantially horizontally in the direction in parallel to the bottom legs of the endless paired belts 9 and above the veneer sheet 1 being carried by the spiked conveyer belts 9 so that no interference occurs between the flexible restraining band 19 and the veneer sheet 1, as shown in FIG. 1. In the illustrated embodiment, the elongated flexible restraining band 19 has such a length that the band 19 is taut or has an appropriate tension when it is extended as shown in FIG. 1.

The rod 23a is normally placed in its retracted position in the air cylinder 23 as shown in FIGS. 1 and 2. When the air cylinder 23 is operated, the rod 23a makes one stroke of reciprocating movement between the retracted position and the extended position (FIG. 3) where end portion of the flexible restraining band 19 connected to the rod 23a is lowered to a position below the top surface of veneer sheet pile 25 on the stacking block 5 so that the band 19 is then bent at and pressed against the edge of the veneer sheet 1 then dropped onto the pile 25 as shown in FIG. 3. It is noted that the air cylinder 23 is operable to cause its rod 23a to move downward at a speed faster than a speed at which an object is dropped by its own weight so that the flexible restraining band 19 is brought into frictional or pressing engagement with the veneer sheet one side thereof which extends in substantially perpendicular relation to the length of the restraining band 19 thereby to restrain the veneer sheet that is being dropped off from the conveyer. As shown in FIG. 1, the air cylinder 23 is also connected to the control 29.

Reference numeral 27 designates a sensor of reflective type photoelectric tube for detecting the arrival of a veneer sheet moved by the endless spiked conveyer belts 9 at the stacking position immediately above the pile of veneer sheets 25. The sensor 27 is connected to the control 29 so that a detection signal developed by the sensor 27 is transmitted to the control 29.

The following will describe the operation of the above veneer sheet stacking apparatus A. As described earlier, the separating bars 15 are normally placed in their raised inoperative or standby position by the air cylinders 17 and the rod 23a of the air cylinder 23 is in its retracted position so that the flexible restraining band 19 extends substantially horizontally in its standby position, as shown in FIGS. 1 and 2.

A veneer sheet 1 placed on the conveyer belt 3 is moved forward or rightward as seen in FIG. 1. As the veneer sheet 1 has moved to a position on the conveyer belt 3 adjacent to the spiked conveyer belts 9, it is pierced by the spikes 7 of the belts 9 and carried forward by the spiked conveyer belts 9 in piercing engagement therewith. When sensor 27 detects the arrival of the veneer sheet 1 at the stacking position in the apparatus, the sensor 27 generates a detection signal to the control 29, which is then operated to transmit a control signal to the air cylinders 17. Accordingly, the separating bars 15 connected to the rods 17a of the air cylinders 17 make a reciprocating movement, so that the bars 15 are pressed against the veneer sheet 1 thereby to release the sheet from pierced engagement with the spiked conveyer belts 9 during the extending movement of the rods 17a.

Substantially simultaneously with the operation of the air cylinders 17 for the separating bars 15, the control 29 responding to the detection signal from the sensor 27 transmits a signal to activate the air cylinder 23 so that its rod 23a is moved reciprocally. During this movement of the rod 23a, the flexible restraining band 19 having one end thereof connected to the rod 23a is lowered to a position, as shown in FIG. 3, where the restraining band 19 is bent at and placed in pressing engagement with one side of the veneer sheet 1 which extends in substantially perpendicular relation to the length of the restraining band 19 or, in the case of the illustrated embodiment, the side which correspond to the leading end thereof as seen in the direction in which the sheet is moved by the conveyer belts 9.

Though not shown specifically in the drawing, since the air cylinder 23 is operable to cause its rod 23a to move downward at a speed faster than that at which an object is dropped by its own weight, the flexible restraining band 19 is brought into frictional or pressing engagement with the veneer sheet at the above side or end, thus restraining the veneer sheet that is being dropped off from the conveyer. As a result, the veneer sheet 1 after being released from pierced engagement with the spiked conveyer belts 9 falls straight downward in frictional or pressed engagement with the flexible restraining band 19 and stacked onto the pile 25 in an orderly manner, as shown in FIG. 3, without making swerving or swaying motion due to the influence of air resistance before being dropped onto the pile 25.

After the rods 17a of the air cylinders 17 the rods 23a of the cylinders 23 have moved back to their retracted positions, the apparatus A waits for stacking of the next veneer sheet.

As apparent to those skilled in the art, since the mass of the band 19 is small, only a small force is necessary to move the band rapidly enough to stack veneer sheets neatly and, therefore, small-sized air cylinders may be used for the cylinders 23. Additionally, the embodiment can solve the aforementioned problem that a separating bar made of rigid material such as steel receives a damaging shock of impact when the bar is moved into pressing contact with the top of the pile having only a small number of veneer sheet. The magnitude of the frictional force between the flexible restraining band 19 and the veneer sheet 1 can be changed by varying the lowering speed of the restraining band 19, which can be accomplished merely by controlling the amount of air to be supplied to the air cylinder 23.

Figure 4:
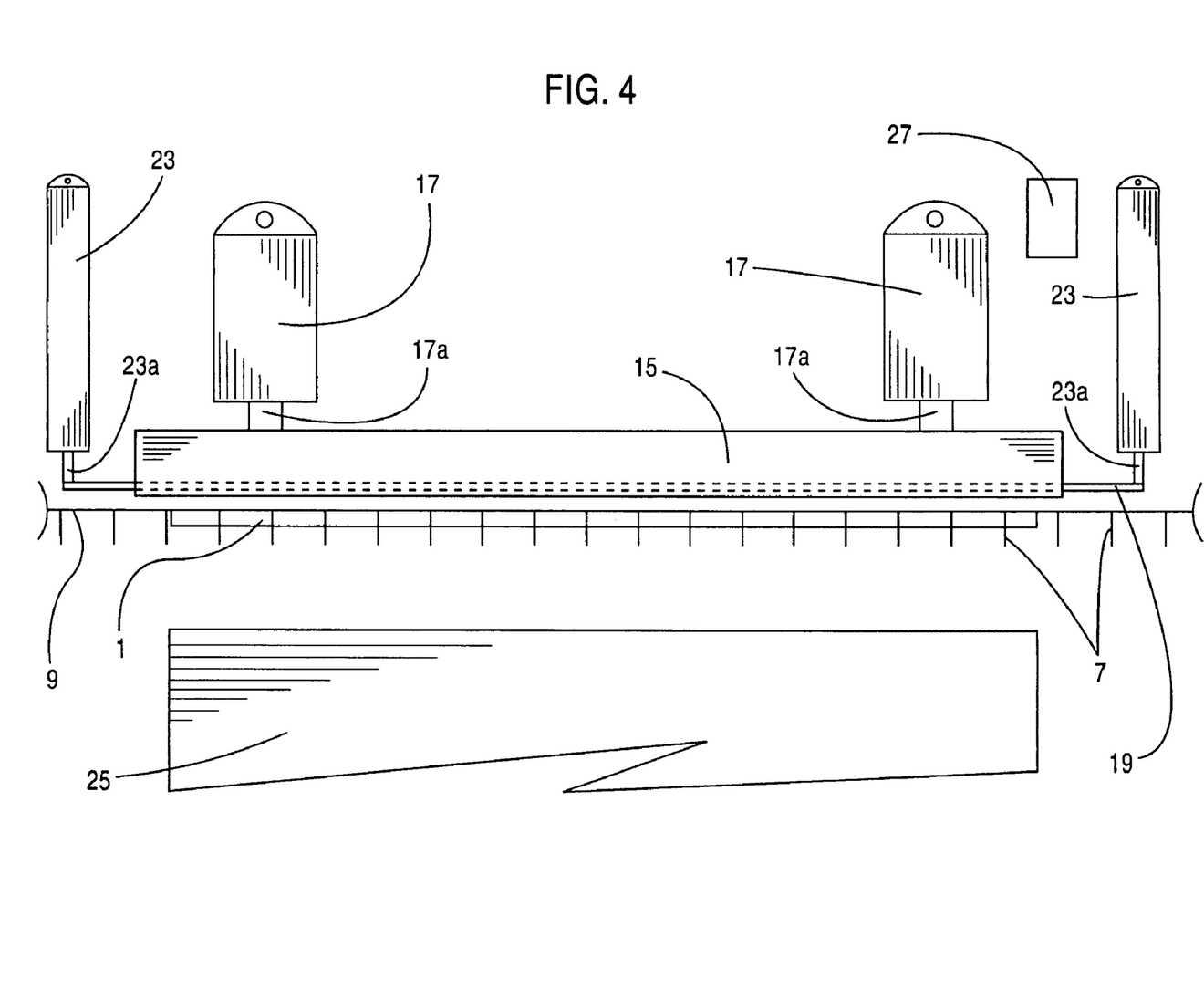
FIG. 4 shows a modified embodiment of veneer sheet stacking apparatus of the present invention.
Figure 5:
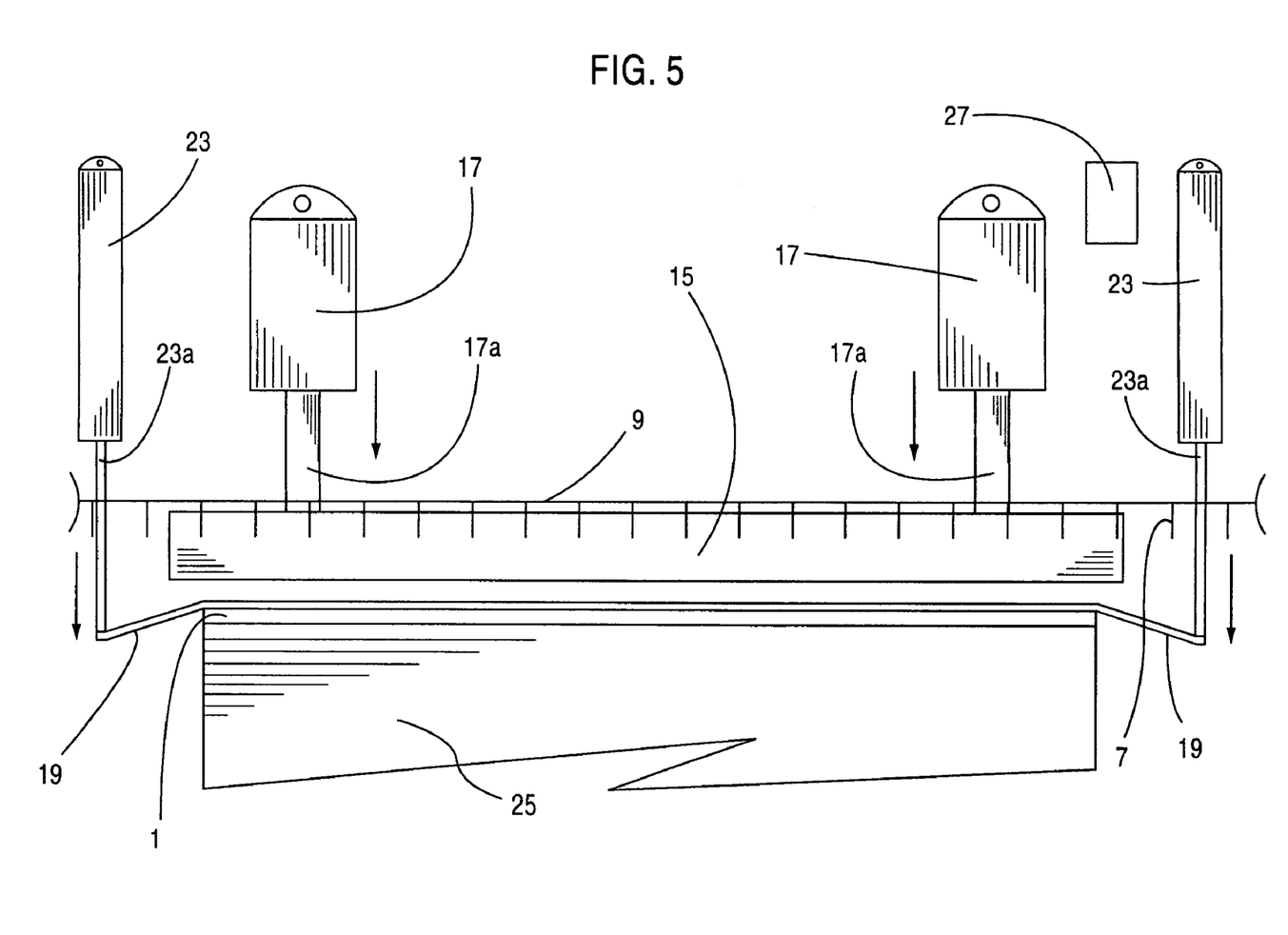
FIG. 5 is an illustrative partial view showing the operation of the apparatus of FIG. 4.

Referring to FIGS. 4 and 5, the following will describe a modified embodiment of veneer sheet stacking apparatus of the present invention.

The modification of FIGS. 4 and 5 differs from the embodiment of FIGS. 1 through 3 in that an additional air cylinder 23 is provided in place of the aforementioned part 21 of the frame of the apparatus of FIG. 1, so that the flexible restraining band 19 is connected at the opposite ends thereof to the distal ends of the rods 23a of the air cylinders 23. In operation of this stacking apparatus of FIG. 4, as the arrival of the veneer sheet 1 moved by the endless spiked conveyer belts 9 at the stacking position in the apparatus is detected by the sensor 27, the air cylinders 17 are activated to move their rods 17a and hence the separating bars 15 downward thereby to separate the veneer sheet 1 from pierced engagement with the spiked conveyer belts 9. Substantially simultaneously, the air cylinders 23 are also activated to extend their rods 23a until the restraining band 19 is bent and presses veneer sheet 1 along the entire dimension thereof as measured along the extension of the flexible restraining band 19, as well as at the opposite sides or ends of the veneer sheet 1, as shown in FIG. 5. Both air cylinders 23 are operable to extend their rods 23a at a rapid speed as in the embodiment of FIGS. 1 through 3 and, therefor, the flexible restraining band 19 is brought into frictional engagement with the veneer sheet being dropped on the top surface of the veneer sheet 1, as well as at the opposite sides thereof, thus restraining the veneer sheet that is being dropped off from the conveyer. Thus, the veneer sheet 1 after being released from the separating bars 15 is moved straight downward the pile 25 while maintaining the frictional or pressed frictional engagement with the restraining band 19.

Figure 6:
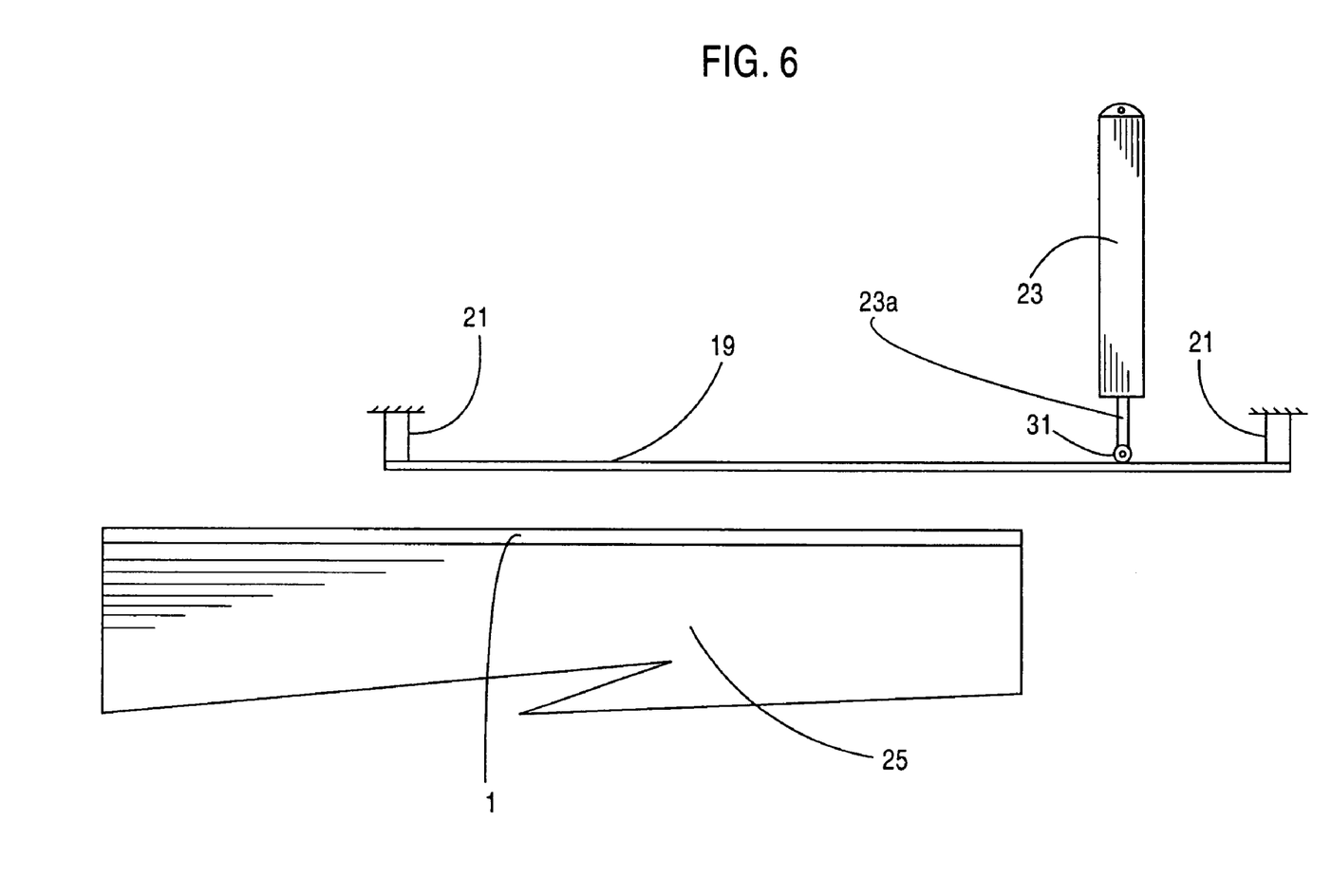
FIG. 6 shows a further modified embodiment of veneer sheet stacking apparatus of the present invention.
Figure 7:
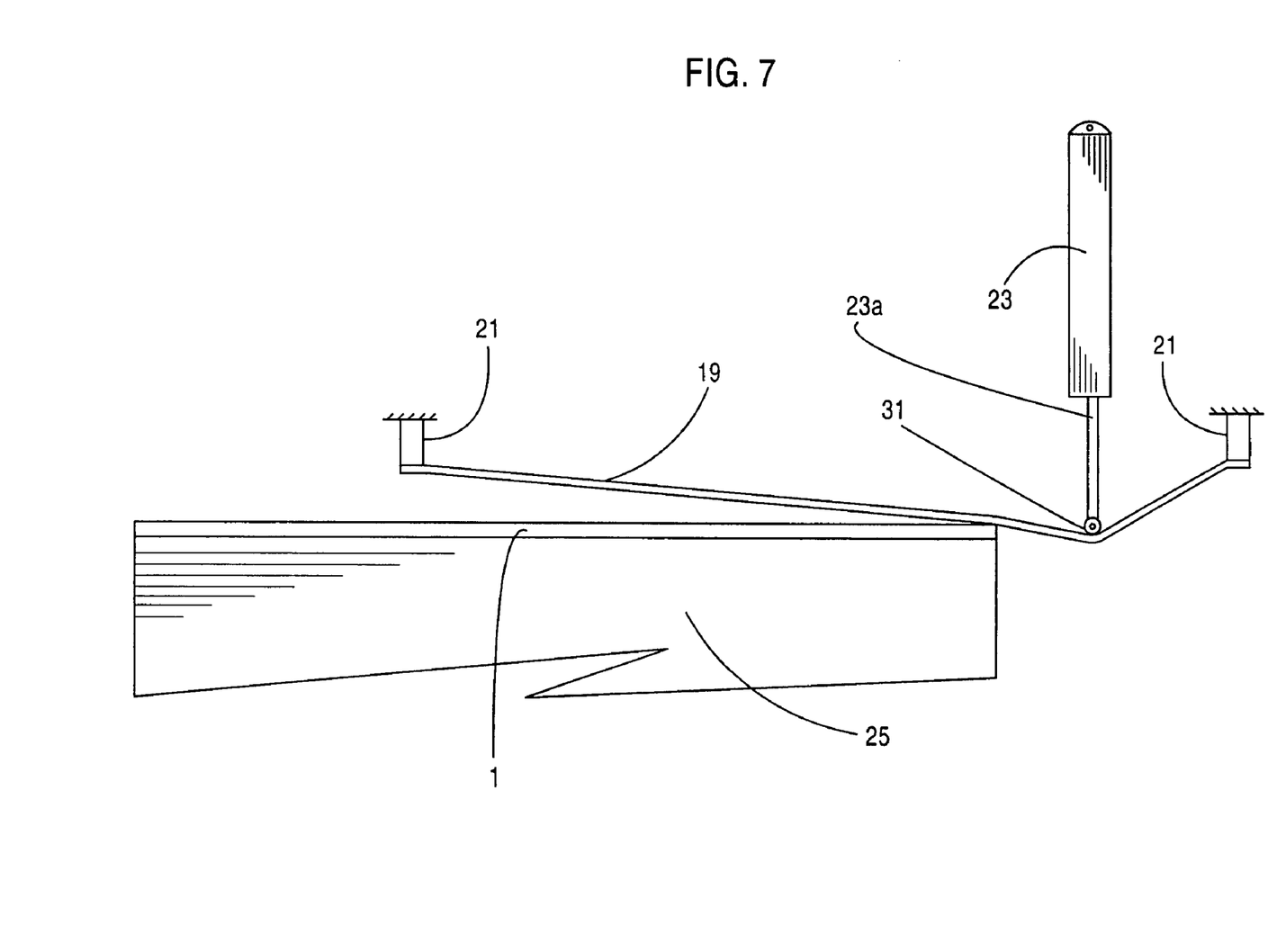
FIG. 7 is a schematic illustrative view showing the operation of the apparatus of FIG. 6.

A still another modified embodiment of veneer sheet stacking apparatus of the present invention will be described while having reference to FIGS. 6 and 7.

In the foregoing embodiment shown, for example, in FIG. 3 wherein one end of the flexible restraining band 19 is directly connected the distal end of the rod 23a of the air cylinder 23, the cylinder 23 and its rod 23a are subjected to a horizontal component of a force which is developed due to the tensile force of the flexible restraining band 19 each time the cylinder 23 is operated to extend its rod 23a. It is thus necessary for the air cylinder 23 to be mounted firmly enough to resist such force. The modified embodiment shown in FIGS. 6 and 7 differs from the foregoing embodiments in that the flexible restraining band 19 is not connected to the piston rod 23a. As shown in FIG. 6 which show only the relevant part of the apparatus for the sake of description of the modification, the elongated restraining band 19 is connected at the opposite ends thereof to the frame 21 of the apparatus and the air cylinder 23 having a freely rotatable roller 31 at the distal end of the cylinder rod 23a is disposed above the restraining band 19 with the roller 23 normally placed in contact with the upper surface of the restraining band 19. In operation of the apparatus of this modified embodiment, the air cylinder 23 is activated to extend its rod 23a and the restraining band 19 is moved downward through he roller 31, as shown in FIG. 7. By using the roller 31 in stead of connecting the restraining band 19 to the rod 23a, the air cylinder 23 and its piston rod 23a will not be subjected to the above-described horizontal component of a force.

It is noted that the apparatus of present invention can be further modified or changed in various ways within the spirit of the invention, as exemplified below.

In the foregoing embodiments, the flexible restraining band 19 is so arranged that it has an appropriate tension in its inoperative standby position where the rod 23a is retracted in its associated air cylinder 23. However, the restraining band 19 does not necessarily have to be tensioned while it is in inoperative state, but it is tensioned when it is lowered in frictional engagement with a veneer sheet.

Though the foregoing embodiments have been described as applied to a method or an apparatus for stacking one veneer sheet at a time, it may be so arranged that two or more veneer sheets which are laid one on another are stacked simultaneously to a pile of veneer sheets.

Though the elongated flexible restraining band 19 of the foregoing embodiments is disposed in parallel to the direction in which the veneer sheet is moved by the spiked conveyer belts 9, one or more restraining bands may be provided in perpendicular relation to the above direction and the air cylinders for moving the band may be arranged, accordingly. Additionally, the flexible restraining band 19 may be substituted by other members such as string, cord or chain which can resist the tension developed during the stacking operation according to the present invention.

The flexible restraining band 19 in its standby position need not be horizontal, but it may extend with such a downward slant toward the downstream end of the restraining band 19, as seen in the moving direction of the veneer sheet 1 carried by the spiked conveyer belts 9, that no physical interference occurs between the incoming veneer sheet 1 and the restraining band 19.

The endless spiked conveyer belts 9 may be stopped temporarily when the veneer sheet 1 is detected by the sensor 27 at the stacking position and the separating bars 15 may be operated during such temporary stop of the spiked conveyer belts 9.

The spiked conveyer belts 9 for carrying a veneer sheet to the stacking position may be substituted by any suitable conveyer belt having a suction device 79 as shown in FIG. 8.

What is claimed is:

1. A method of stacking a veneer sheet having four sides and carried by a conveyer onto a pile of veneer sheets, comprising, separating the veneer sheet from the conveyer at a predetermined position immediately above the pile of veneer sheets thereby to allow the separated veneer sheet to drop from the conveyer; and restraining the veneer sheet by an elongated flexible member which is normally disposed extending above and without interfering with the veneer sheet carried by the conveyer and operable to be lowered substantially simultaneously with said separating of the veneer sheet in a taut state and at such a speed that the elongated flexible member is brought into frictional engagement with the veneer sheet at at least one side thereof which extends in substantially perpendicular relation to the length of said elongated flexible member thereby to restrain the veneer sheet being dropped from the conveyer, until the elongated flexible member is bent at said one side of the veneer sheet which is then dropped onto the pile of veneer sheets thereby to restrain the veneer sheet.

2. An apparatus of stacking a veneer sheet having four sides onto a pile of veneer sheets, comprising, a conveyer for carrying the veneer sheet in a predetermined direction;

means for separating the veneer sheet from the conveyer at a predetermined position immediately above said pile of veneer sheets thereby to allow the separated veneer sheet to drop from the conveyer;

an elongated flexible member;

means for moving said elongated flexible member between the standby position thereof where the elongated flexible member is disposed extending above and without interfering with the veneer sheet carried by the conveyer and the lowered position thereof where the elongated flexible member is lowered until being bent in pressing engagement with the veneer sheet then dropped onto the pile of veneer sheets at at least one side of the veneer sheet which extends in substantially perpendicular relation to the length of the elongated flexible member, said moving means being operable to cause the elongated flexible member to be lowered toward said lowered position in a taut state and at such a speed that the elongated flexible member is brought into frictional engagement with the veneer sheet being dropped;

a sensor for detecting the arrival of the veneer sheet at said predetermined position and operable to generate a detection signal;

a control operable in response to said detection signal from said sensor to activate said separating means and said moving means so that the veneer sheet is separated from said conveyer and substantially simultaneously the elongated flexible member is lowered toward the lowered position.

3. An apparatus according to claim 2, wherein said elongated flexible member in the standby position thereof extends substantially in said predetermined direction in which the veneer sheet is carried by said conveyer, and said moving means is located and operable such that the elongated flexible member in the lowered position thereof is bent in pressing engagement with the veneer sheet at one side thereof which corresponds to the leading side of the veneer sheet as seen in the direction in which the veneer sheet is moved by said conveyer.

4. An apparatus according to claim 3, wherein said moving means includes a cylinder having an extensible rod, and said elongated flexible member is connected at one end thereof to the rod of the cylinder.

5. An apparatus according to claim 2, wherein said elongated flexible member in the standby position thereof extends substantially in said predetermined direction in which the veneer sheet is carried by said conveyer, and said moving means is located and operable such that the elongated flexible member in the lowered position thereof is bent in pressing engagement with the veneer sheet at two sides thereof which correspond to the leading and trailing sides of the veneer sheet as seen in the direction in which the veneer sheet is moved by said conveyer.

6. An apparatus according to claim 5, wherein said moving means includes cylinders each having an extensible rod, and said elongated flexible member is connected at the opposite ends thereof to the rods of said cylinders.

7. An apparatus according to claim 3, wherein further comprising a stationary frame, wherein said elongated flexible member is connected at opposite ends thereof to said frame of the apparatus, and said moving means includes a cylinder having an extensible rod with a roller at the distal end thereof and operable to move by way of said roller the elongated flexible member to said lowered position.

\* \* \* \* \*